United States Patent
Kim et al.

(10) Patent No.: US 8,107,568 B2
(45) Date of Patent: Jan. 31, 2012

(54) COUPLING CHANNEL NOISE CANCELING CIRCUIT

(75) Inventors: Dong Hyun Kim, Gyunggi-do (KR); Yong Woon Park, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 509 days.

(21) Appl. No.: 12/402,622

(22) Filed: Mar. 12, 2009

(65) Prior Publication Data

US 2010/0074380 A1    Mar. 25, 2010

(30) Foreign Application Priority Data

Sep. 24, 2008  (KR) .................. 10-2008-0093748

(51) Int. Cl.
*H03D 1/04* (2006.01)
(52) U.S. Cl. ........................ 375/346; 375/296
(58) Field of Classification Search .................. 375/346, 375/295–296, 284–285
See application file for complete search history.

(56) References Cited

U.S. PATENT DOCUMENTS

| | | | |
|---|---|---|---|
| 6,264,286 B1 * | 7/2001 | Ehrlich et al. ............ 303/7 |
| 6,515,712 B1 * | 2/2003 | Jeong ....................... 348/608 |
| 7,962,108 B1 * | 6/2011 | Khlat et al. ............. 455/114.3 |
| 2006/0189285 A1 * | 8/2006 | Takano et al. .......... 455/127.2 |
| 2006/0291598 A1 | 12/2006 | Gebara et al. |
| 2007/0207768 A1 * | 9/2007 | So et al. .................. 455/403 |

* cited by examiner

*Primary Examiner* — Emmanuel Bayard
(74) *Attorney, Agent, or Firm* — Lowe, Hauptman, Ham & Berner, LLP

(57) ABSTRACT

A coupling channel noise canceling circuit includes a signal detecting unit, a gain setting unit, a cancel signal generating unit, and a noise canceling unit. The signal detecting unit detects a phase difference and a voltage difference between a broadcast RX signal and a noise cancel signal in a set mode. The gain setting unit outputs compensation gain values corresponding to the phase difference and the voltage difference from the signal detecting unit in the set mode. The cancel signal generating unit sets the compensation gain values from the gain setting unit as an amplification gain for amplification of a communication TX signal in the set mode, and amplifies the communication TX signal by a predetermined gain to generate the noise cancel signal in the set mode and an operation mode. The noise canceling unit cancels an interference noise from the broadcast RX signal by using the noise cancel signal from the cancel signal generating unit in the operation mode.

6 Claims, 3 Drawing Sheets

COUPLING CHANNEL NOISE CANCELING CIRCUIT

CROSS-REFERENCE TO RELATED APPLICATIONS

This application claims the priority of Korean Patent Application No. 2008-93748 filed on Sep. 24, 2008, in the Korean Intellectual Property Office, the disclosure of which is incorporated herein by reference.

BACKGROUND OF THE INVENTION

1. Field of the Invention

The present invention relates to a coupling channel noise canceling circuit applicable to a portable terminal such as a European GSM (Global System for Mobile Communication) terminal, and more particularly, to a coupling channel noise canceling circuit that can cancel a noise due to coupling channel characteristics in operation by presetting the coupling channel characteristics that cause a noise due to an intermodulation between a communication signal of, for example, GSM and a broadcast signal of, for example, DVB-H (Digital Video Broadcasting-Handheld) or a noise due to an interference between communication signals.

2. Description of the Related Art

In a wireless communication field, the widespread use of portable phones is rapidly advancing a ubiquitous (mobile communication) society that can provide a free, world-wide communication service anytime, anywhere. Also, the development of a technology capable of transmitting a large amount of information as well as simple call data is rapidly advancing the integration of IT equipments including portable terminals, so that image and broadcast signals can also be viewed through portable terminals.

However, modules added in this integration process to provide various functions in portable terminals and IT equipments may cause interference noises on other modules. What is therefore required a technology of analyzing and canceling the influence of interference signals due to the modules added in the integration process.

Recently, as much attention is recently drawn to digital broadcasting, DMB (Digital Multimedia Broadcasting) technologies are being developed in Korean and DVB (Digital Video Broadcasting) technologies are being developed in Europe.

Examples of the DVB include DVB-T (Digital Video Broadcasting-Terrestrial) and DVB-H (Digital Video Broadcasting-Handheld). The DVB-T provides signal reception at a home or office stationary device from a broadcasting station, and the DVB-H considers the low power consumption, mobility and portability of portable phones or portable image devices.

When one terminal supports two or more functions (e.g., GSM/DVB-H) according to the integration of mobile terminals, an interference between modules may degrade the receive (RX) sensitivity of the modules. Various frequency components such as a DVB-H signal, DVB-T signal, a GSM-TX signal and a GSM-RX signal are applied to signals received by an antenna of a DVB-H receiver. A signal, which affects the DVB-H receiver most greatly among the received signals, is an interference noise due to an intermodulation between a DVB-T signal and a GSM-TX signal as illustrated in FIG. 1.

FIG. 1 is a diagram illustrating an interference noise due to an intermodulation between a DVB-T broadcast signal and a GSM-TX signal. Referring to FIG. 1, even when the frequency bands of an actual GSM-TX signal and DVB-T signal are different from a DVB-H RX frequency band, an intermodulation component of the two frequency components is generated within the DVB-H RX frequency band, so that it behaves as an interference noise signal stronger than a weak DVB-H signal, thus degrading the RX sensitivity of a DVB-H receiving module.

FIG. 2 is a diagram illustrating an interference noise due to a GSM-TX signal. Referring to FIG. 2, when a TX signal of a GSM terminal is transmitted, an interference signal due to a phase noise is generated very strongly in side-bands, in addition to a GSM-TX frequency. This interference signal is transmitted in a DVB-H RX band, thus degrading the RX sensitivity of the DVB-H. In actuality, an RX broadcast signal of a GSM/DVB-H terminal is a low-power signal of about −80 dBm or less, and it is necessary to deal with the performance degradation due to an interference signal of a GSM-TX signal higher than it. An interference signal cancellation of about −22 dB is necessary for improvement of the DVB-H RX sensitivity.

What is therefore required is a countermeasure against an interference noise due to an intermodulation between the RX frequency band of the DVB-H and the frequency band of the GSM-TX/DVB-T signal and an interference noise due to the GSM-TX signal.

A related art interference noise canceling technology uses a filter to cancel frequency bands except RX frequency bands in a receiver. This interference noise canceling technology, however, fails to efficiently cancel an interference noise present in the RX frequency band.

SUMMARY OF THE INVENTION

An aspect of the present invention provides a coupling channel noise canceling circuit that can cancel a noise due to coupling channel characteristics in operation by presetting the coupling channel characteristics that cause a noise due to an intermodulation between a communication signal of, for example, GSM and a broadcast signal of, for example, DVB-H (Digital Video Broadcasting-Handheld) or a noise due to an interference between communication signals.

According to an aspect of the present invention, there is provided a coupling channel noise canceling circuit including: a signal detecting unit detecting a phase difference and a voltage difference between a broadcast receive (RX) signal and a noise cancel signal in the set mode; a gain setting unit outputting compensation gain values corresponding to the phase difference and the voltage difference from the signal detecting unit in the set mode; a cancel signal generating unit setting the compensation gain values from the gain setting unit as an amplification gain for amplification of a communication transmit (TX) signal in the set mode, and amplifying the communication TX signal by a predetermined gain to generate the noise cancel signal in the set mode and an operation mode; and a noise canceling unit canceling an interference noise from the broadcast RX signal by using the noise cancel signal from the cancel signal generating unit in the operation mode.

The signal detecting unit may include: a phase detector detecting the phase difference between the broadcast RX signal and the noise cancel signal; and a power detector detecting the voltage difference between the broadcast RX signal and the noise cancel signal.

The gain setting unit may include: an analog-to-digital converter converting the phase difference and the voltage difference from the signal detecting unit into digital signals; an I-Q mapper outputting a first compensation value and a second compensation value that correspond to the digital phase difference and the digital voltage difference from the analog-to-digital converter; and an digital-to-analog converter converting the first compensation value and the second compensation value from the I-Q mapper into a first analog compensation value and a second analog compensation value, and outputting the first analog compensation value and the second analog compensation value to the cancel signal generating unit.

The cancel signal generating unit may include: a first variable gain amplifier setting the first analog compensation value from the gain setting unit as an amplification gain in the set mode, and amplifying the communication TX signal by a predetermined gain in the set mode and the operation mode; a phase shifter shifting the phase of the communication TX signal by a predetermined phase; a second variable gain amplifier setting the second analog compensation value from the gain setting unit as an amplification gain in the set mode, and amplifying the phase-shifted communication TX signal from the phase shifter by a predetermined gain in the set mode and the operation mode; and a mixer mixing the output signal of the first variable gain amplifier and the output signal of the second variable gain amplifier to generate the noise cancel signal.

The noise canceling unit may mix the broadcast RX signal and the inversion signal of the noise cancel signal from the cancel signal generating unit to cancel an interference noise from the broadcast RX signal, in the operation mode.

The I-Q mapper may include a mapping table where the first compensation value and the second compensation value corresponding to the digital phase difference and the digital voltage difference from the analog-to-digital converter are mapped in advance, read the first compensation value and the second compensation value corresponding to the digital phase difference and the digital voltage difference from the mapping table, and output the read values.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
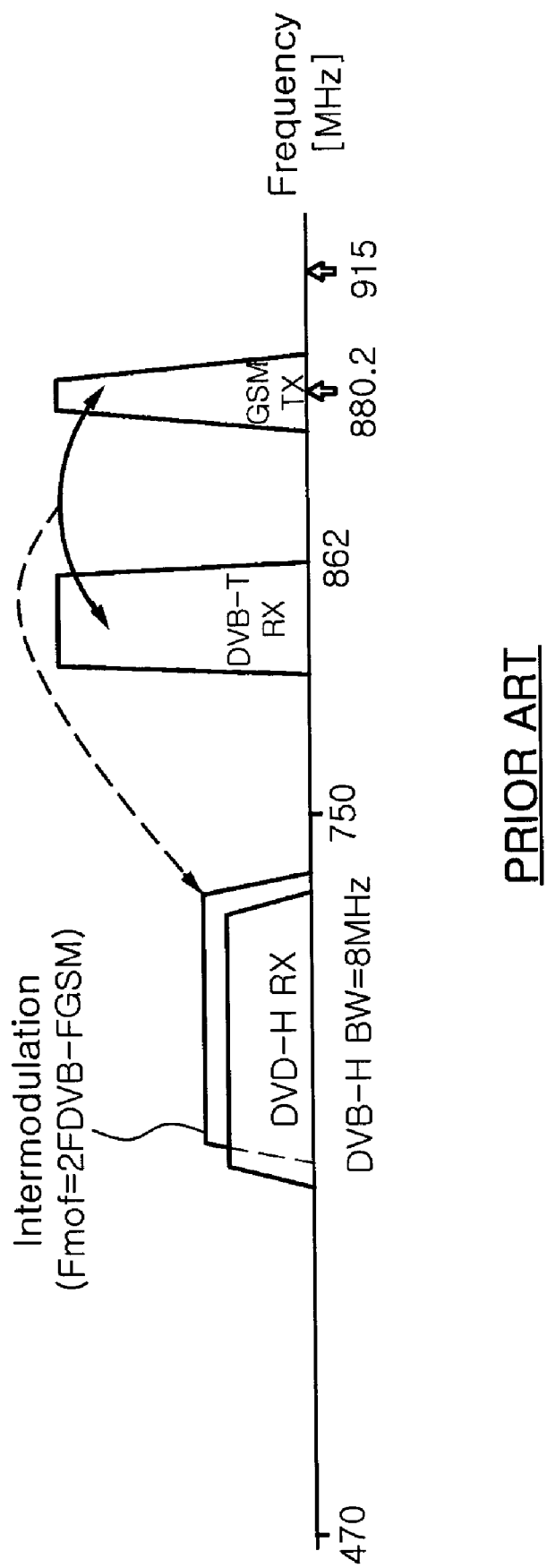
FIG. 1 is a diagram illustrating an interference noise due to an intermodulation between a DVB-T (Digital Video Broadcasting-Terrestrial) broadcast signal and a GSM-TX signal.
Figure 2:
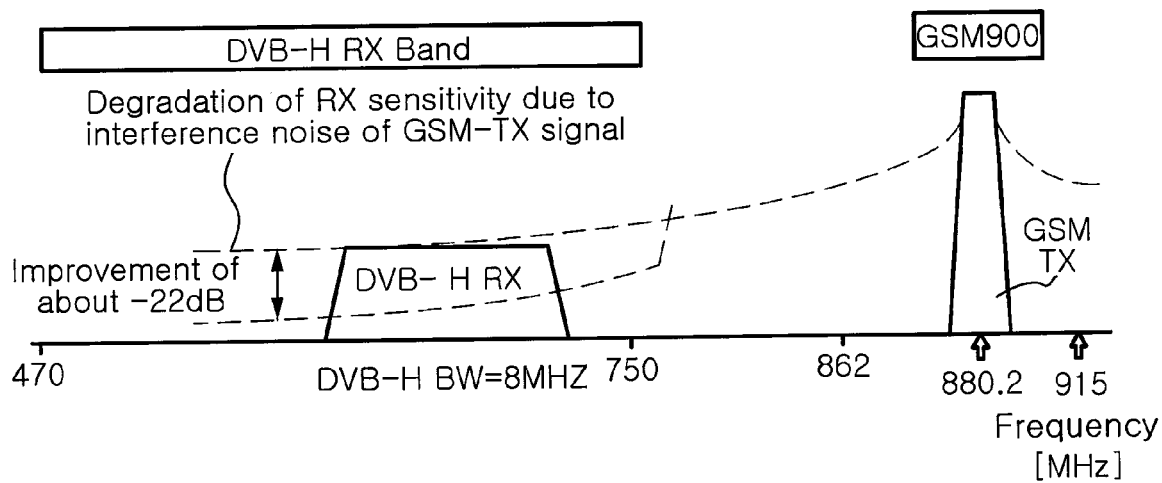
FIG. 2 is a diagram illustrating an interference noise due to a GSM-TX signal.

Exemplary embodiments of the present invention will now be described in detail with reference to the accompanying drawings. Like reference numerals in the drawings denote like elements.

Figure 3:
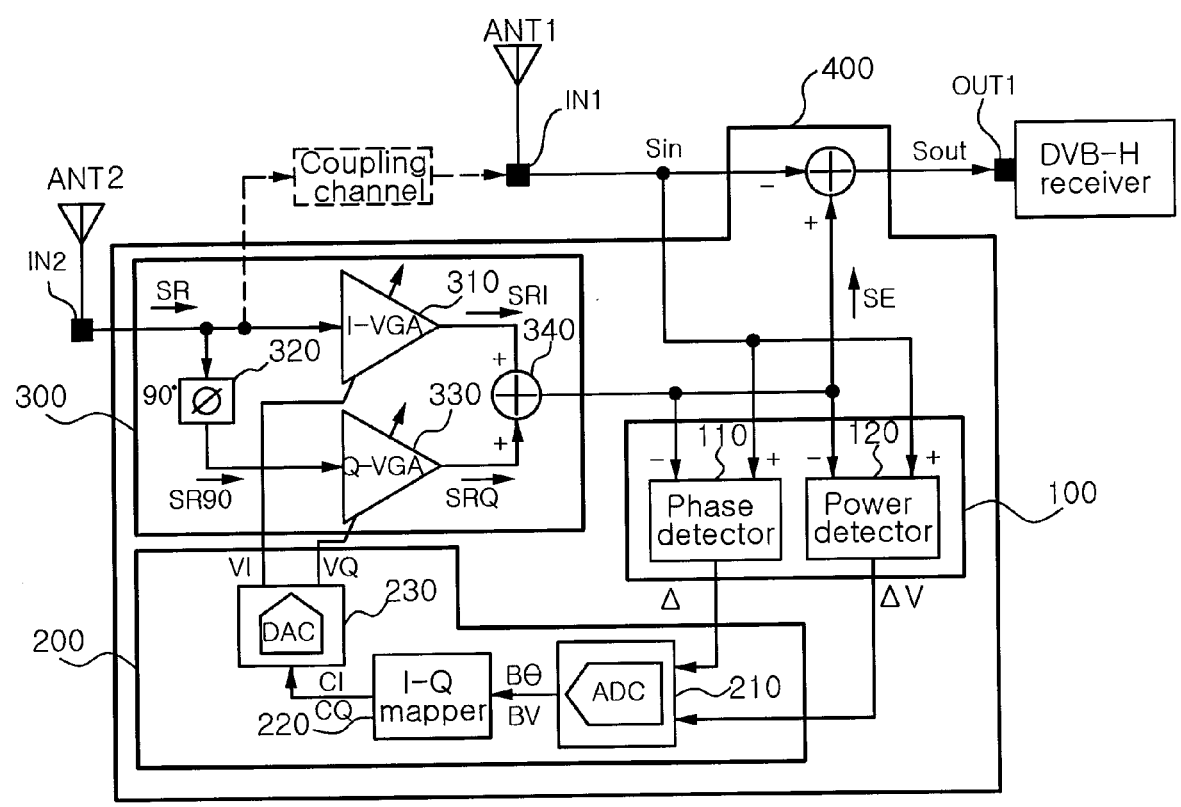
FIG. 3 is a block diagram of a coupling channel noise canceling circuit according to an exemplary embodiment of the present invention.

FIG. 3 is a block diagram of a coupling channel noise canceling circuit according to an exemplary embodiment of the present invention.

Referring to FIG. 3, a coupling channel noise canceling circuit according to an exemplary embodiment of the present invention includes a signal detecting unit 100, a gain setting unit 200, a cancel signal generating unit 300, and a noise canceling unit 400. The signal detecting unit 100 detects a phase difference $\Delta\theta$ and a voltage difference $\Delta V$ between a broadcast receive (RX) signal Sin and a noise cancel signal SE in the set mode. In the set mode, the gain setting unit 200 outputs compensation gain values VI and VQ corresponding to the phase difference $\Delta\theta$ and the voltage difference $\Delta V$ from the signal detecting unit 100. In the set mode, the cancel signal generating unit 300 sets the compensation gain values VI and VQ from the gain setting unit 200 as an amplification gain for amplifying a communication transmit (TX) signal SR. In the set mode and an operation mode, the cancel signal generating unit 300 amplifies the communication TX signal SR by a predetermined gain to generate the noise cancel signal SE. In the operation mode, the noise canceling unit 400 cancels an interference noise from the broadcast RX signal Sin by using the noise cancel signal SE from the cancel signal generating unit 300.

The signal detecting unit 100 includes a phase detector 110 and a power detector 120. In the set mode, the phase detector detects the phase difference $\Delta V$ between the broadcast RX signal Sin and the noise cancel signal SE and the power detector 120 detects the voltage difference $\Delta V$ between the broadcast RX signal Sin and the noise cancel signal SE.

The gain setting unit 200 includes an analog-to-digital converter (ADC) 210, an I-Q mapper 220, and a digital-to-analog converter (DAC) 230. The ADC 210 converts the phase difference $\Delta\theta$ and the voltage difference $\Delta V$ from the signal detecting unit 100 into digital signals. The I-Q mapper 220 outputs a first compensation value CI and a second compensation value CQ that correspond to a digital phase difference BQ and a digital voltage difference BV from the ADC 210. The DAC 230 converts the first compensation value CI and the second compensation value CQ from the I-Q mapper 220 into a first analog compensation value VI and a second analog compensation value VQ, and outputs the first analog compensation value VI and the second analog compensation value VQ to the cancel signal generating unit 300.

The cancel signal generating unit 300 includes a first variable gain amplifier 310, a phase shifter 320, a second variable gain amplifier 330, and a mixer 340. In the set mode, the first variable gain amplifier 310 sets the first analog compensation value VI from the gain setting unit 200 as an amplification gain. In the set mode and the operation mode, the first variable gain amplifier 310 amplifies the communication TX signal SR by a predetermined gain. The phase shifter 320 shifts the phase of the communication TX signal SR by a predetermined phase. In the set mode, the second variable gain amplifier 330 sets the second analog compensation value VQ from the gain setting unit 200 as an amplification gain. In the set mode and the operation mode, the second variable gain amplifier 330 amplifies a phase-shifted communication TX signal SR90 from the phase shifter 320 by a predetermined gain. The mixer 340 mixes an output signal SRI of the first variable gain amplifier 310 and an output signal SRQ of the second variable gain amplifier 330 to generate the noise cancel signal SE.

Herein, the phase shifter 320 of the cancel signal generating unit 300 may disperse the phase or may be implemented in various configurations such as a parallel configuration, which can achieve the same object in generating the noise cancel signal SE required in the present invention.

In the operation mode, the noise canceling unit 400 mixes the broadcast RX signal Sin and the inversion signal of the noise cancel signal SE from the cancel signal generating unit 300 to cancel an interference noise from the broadcast RX signal Sin.

The I-Q mapper 220 includes a mapping table where the first compensation value CI and the second compensation value CQ corresponding to the digital phase difference BQ and the digital voltage difference BV from the ADC 210 are mapped in advance. The I-Q mapper 220 reads the first compensation value CI and the second compensation value CQ corresponding to the digital phase difference BQ and the digital voltage difference BV from the mapping table, and outputs the read values.

Hereinafter, a detailed description is given of the operation and effect of the present.

A coupling channel noise canceling circuit according to an exemplary embodiment of the present invention is described in detail with reference to FIG. 3. Referring to FIG. 3, a coupling channel noise canceling circuit according to an exemplary embodiment of the present invention includes a signal detecting unit 100, a gain setting unit 200, a cancel signal generating unit 300, and a noise canceling unit 400.

The signal detecting unit 100 detects a phase difference $\Delta\theta$ and a voltage difference $\Delta V$ between a broadcast receive RX signal Sin and a noise cancel signal SE in the set mode.

In the set mode, the gain setting unit 200 outputs compensation gain values VI and VQ corresponding to the phase difference $\Delta\theta$ and the voltage difference $\Delta V$ from the signal detecting unit 100.

In the set mode, the cancel signal generating unit 300 sets the compensation gain values VI and VQ from the gain setting unit 200 as an amplification gain for amplifying a communication TX signal SR. In the set mode and the operation mode, the cancel signal generating unit 300 amplifies the communication TX signal SR by a predetermined gain to generate the noise cancel signal SE.

In the operation mode, the noise canceling unit 400 cancels an interference noise from the broadcast RX signal Sin by using the noise cancel signal SE from the cancel signal generating unit 300.

The coupling channel noise canceling circuit according to the present invention presets an amplification gain related to coupling channel characteristics in the set mode in order to be able to cancel an interference noise, and generates a noise cancel signal in the operation mode by using the preset amplification gain, thereby making it possible to cancel an interference noise from a broadcast signal by using the noise cancel signal.

Hereinafter, the signal detecting unit 100, the gain setting unit 200, the cancel signal generating unit 300, and the noise canceling unit 400 are described with discrimination between the set mode and the operation mode.

The set mode of the coupling channel noise canceling circuit of the present invention is first described as follows.

The signal detecting unit 100 includes a phase detector 110 and a power detector 120. In the set mode, the phase detector 110 detects the phase difference $\Delta\theta$ between the broadcast RX signal Sin and the noise cancel signal SE. The power detector 120 detects the voltage difference $\Delta V$ between the broadcast RX signal Sin and the noise cancel signal SE.

The gain setting unit 200 includes an analog-to-digital converter (ADC) 210, an I-Q mapper 220, and a digital-to-analog converter (DAC) 230. In this case, the ADC 210 converts the phase difference $\Delta\theta$ and the voltage difference $\Delta V$ from the signal detecting unit 100 into digital signals.

The I-Q mapper 220 outputs a first compensation value CI and a second compensation value CQ that correspond to a digital phase difference BQ and a digital voltage difference BV from the ADC 210.

The DAC 230 converts the first compensation value CI and the second compensation value CQ from the I-Q mapper 220 into a first analog compensation value VI and a second analog compensation value VQ, and outputs the first analog compensation value VI and the second analog compensation value VQ to the cancel signal generating unit 300.

For example, the I-Q mapper 220 includes a mapping table where the first compensation value CI and the second compensation value CQ corresponding to the digital phase difference BQ and the digital voltage difference BV from the ADC 210 are mapped in advance. In this case, the I-Q mapper 220 reads the first compensation value CI and the second compensation value CQ corresponding to the digital phase difference BQ and the digital voltage difference BV from the mapping table, and outputs the read values.

The cancel signal generating unit 300 includes a first variable gain amplifier 310, a phase shifter 320, a second variable gain amplifier 330, and a mixer 340. In this case, the first variable gain amplifier 310 sets the first analog compensation value VI from the gain setting unit 200 as an amplification gain, and amplifies the communication TX signal SR by a predetermined gain. The phase shifter 320 shifts the phase of the communication TX signal SR by a predetermined phase. The second variable gain amplifier 330 sets the second analog compensation value VQ from the gain setting unit 200 as an amplification gain, and amplifies a phase-shifted communication TX signal SR90 from the phase shifter 320 by a predetermined gain. The mixer 340 mixes an output signal SRI of the first variable gain amplifier 310 and an output signal SRQ of the second variable gain amplifier 330 to generate the noise cancel signal SE.

Through the above operations, the amplification gain capable of generating the noise cancel signal SE for the interference noise due to the coupling channel characteristics is set in each of the first variable gain amplifier 310 and the second variable gain amplifier 330 of the cancel signal generating unit 300.

The operation mode of the coupling channel noise canceling circuit of the present invention is now described as follows.

In the cancel signal generating unit 300, the first variable gain amplifier 310 amplifies the communication TX signal SR by a preset gain and outputs the amplified signal. The phase shifter 320 shifts the phase of the communication TX signal SR by a predetermined phase. Also, the second variable gain amplifier 330 amplifies the phase-shifted communication TX signal SR90 from the phase shifter 320 by a preset gain.

The mixer 340 mixes the output signal SRI of the first variable gain amplifier 310 and the output signal SRQ of the second variable gain amplifier 330 to generate the noise cancel signal SE, and outputs the generated noise cancel signal SE to the noise canceling unit 400.

The noise canceling unit 400 mixes the broadcast RX signal Sin and the inversion signal of the noise cancel signal SE from the cancel signal generating unit 300 to cancel an interference noise from the broadcast RX signal Sin.

As described above, the present invention presets coupling channel characteristics, which cause a noise due to an intermodulation between a communication signal of, for example, GSM and a broadcast signal of, for example, DVB-H or a noise due to an interference between communication signals, and generates a noise cancel signal corresponding to the preset coupling channel characteristics in the operation mode, thus making it possible to cancel a noise due to the coupling channel characteristics.

While the present invention has been shown and described in connection with the exemplary embodiments, it will be apparent to those skilled in the art that modifications and variations can be made without departing from the spirit and scope of the invention as defined by the appended claims.

What is claimed is:

1. A coupling channel noise canceling circuit comprising:
   a signal detecting unit detecting a phase difference and a voltage difference between a broadcast receive (RX) signal and a noise cancel signal in a set mode;
   a gain setting unit outputting compensation gain values corresponding to the phase difference and the voltage difference from the signal detecting unit in the set mode;
   a cancel signal generating unit setting the compensation gain values from the gain setting unit as an amplification gain for amplification of a communication transmit (TX) signal in the set mode, and amplifying the communication TX signal by a predetermined gain to generate the noise cancel signal in the set mode and an operation mode; and
   a noise canceling unit canceling an interference noise from the broadcast RX signal by using the noise cancel signal from the cancel signal generating unit in the operation mode.

2. The coupling channel noise canceling circuit of claim 1, wherein the signal detecting unit comprises:
   a phase detector detecting the phase difference between the broadcast RX signal and the noise cancel signal; and
   a power detector detecting the voltage difference between the broadcast RX signal and the noise cancel signal.

3. The coupling channel noise canceling circuit of claim 2, wherein the gain setting unit comprises:
   an analog-to-digital converter converting the phase difference and the voltage difference from the signal detecting unit into digital signals;
   an I-Q mapper outputting a first compensation value and a second compensation value that correspond to the digital phase difference and the digital voltage difference from the analog-to-digital converter; and
   an digital-to-analog converter converting the first compensation value and second compensation value from the I-Q mapper into a first analog compensation value and a second analog compensation value, and outputting the first analog compensation value and the second analog compensation value to the cancel signal generating unit.

4. The coupling channel noise canceling circuit of claim 3, wherein the cancel signal generating unit comprises:
   a first variable gain amplifier setting the first analog compensation value from the gain setting unit as an amplification gain in the set mode, and amplifying the communication TX signal by a predetermined gain in the set mode and the operation mode;
   a phase shifter shifting the phase of the communication TX signal by a predetermined phase;
   a second variable gain amplifier setting the second analog compensation value from the gain setting unit as an amplification gain in the set mode, and amplifying the phase-shifted communication TX signal from the phase shifter by a predetermined gain in the set mode and the operation mode; and
   a mixer mixing the output signal of the first variable gain amplifier and the output signal of the second variable gain amplifier to generate the noise cancel signal.

5. The coupling channel noise canceling circuit of claim 4, wherein the noise canceling unit mixes the broadcast RX signal and the inversion signal of the noise cancel signal from the cancel signal generating unit to cancel an interference noise from the broadcast RX signal, in the operation mode.

6. The coupling channel noise canceling circuit of claim 5, wherein the I-Q mapper comprises a mapping table where the first compensation value and the second compensation value corresponding to the digital phase difference and the digital voltage difference from the analog-to-digital converter are mapped in advance, reads the first compensation value and the second compensation value corresponding to the digital phase difference and the digital voltage difference from the mapping table, and outputs the read values.

* * * * *